United States Patent
Cook et al.

(10) Patent No.: US 9,965,331 B2
(45) Date of Patent: *May 8, 2018

(54) SYSTEM AND METHOD FOR RUNTIME GROUPING OF PROCESSING ELEMENTS IN STREAMING APPLICATIONS

(71) Applicant: International Business Machines Corporation, Armonk, NY (US)

(72) Inventors: Alexander Cook, Rochester, MN (US); David M. Koster, Rochester, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/293,896

(22) Filed: Oct. 14, 2016

(65) Prior Publication Data
US 2017/0155594 A1    Jun. 1, 2017

Related U.S. Application Data

(63) Continuation of application No. 15/242,703, filed on Aug. 22, 2016, which is a continuation of application (Continued)

(51) Int. Cl.
*G06F 9/46* (2006.01)
*G06F 15/173* (2006.01)
(Continued)

(52) U.S. Cl.
CPC ............... *G06F 9/505* (2013.01); *G06F 9/48* (2013.01); *G06F 9/485* (2013.01); *G06F 9/4806* (2013.01); *G06F 9/4843* (2013.01); *G06F 9/4868* (2013.01); *G06F 9/4881* (2013.01); *G06F 9/4887* (2013.01); *G06F 9/50* (2013.01);
(Continued)

(58) Field of Classification Search
None
See application file for complete search history.

(56) References Cited

U.S. PATENT DOCUMENTS 5,367,675 A    11/1994    Cheng et al.
6,477,540 B1   11/2002    Singh et al.
(Continued)

FOREIGN PATENT DOCUMENTS

WO    2009065072 A1    5/2009

OTHER PUBLICATIONS

Warski, Adam, "Comparing Akka-Stream and Scalaz-Stream With Code Examples", Softwaremill, May 28, 2015, pp. 1-16.
(Continued)

*Primary Examiner* — Charles M Swift
(74) *Attorney, Agent, or Firm* — Brian J. Colandreo, Esq.; Jeffrey T. Placker, Esq.; Holland & Knight LLP

(57) ABSTRACT

A method, computer program product, and computer system for dynamically grouping and un-grouping processing operators and processing elements used by a streaming application. A distributed processing elements utilization of resources may be monitored to identify candidate operators and candidate processing elements for at least one of parallelization and fusion. At runtime, via at least one of parallelization and fusion, the grouping and un-grouping of the identified candidate operators and candidate processing elements may be dynamically adjusted.

17 Claims, 8 Drawing Sheets

Related U.S. Application Data

No. 14/956,960, filed on Nov. 30, 2015, now Pat. No. 9,535,763.

(51) Int. Cl.
*G06F 9/50* (2006.01)
*H04L 12/911* (2013.01)
*G06F 9/48* (2006.01)
*H04L 29/08* (2006.01)
*H04L 12/24* (2006.01)

(52) U.S. Cl.
CPC .......... *G06F 9/5005* (2013.01); *G06F 9/5011* (2013.01); *G06F 9/5016* (2013.01); *G06F 9/5027* (2013.01); *G06F 9/5038* (2013.01); *G06F 9/5061* (2013.01); *G06F 9/5066* (2013.01); *G06F 9/5083* (2013.01); *G06F 9/5088* (2013.01); *H04L 47/70* (2013.01); *H04L 41/12* (2013.01); *H04L 67/10* (2013.01)

(56) References Cited

U.S. PATENT DOCUMENTS

| | | |
|---|---|---|
| 6,601,064 B1 | 7/2003 | Nag et al. |
| 6,728,949 B1 | 4/2004 | Bryant et al. |
| 7,159,212 B2 | 1/2007 | Schenk et al. |
| 7,209,927 B2 | 4/2007 | Donatelli et al. |
| 7,526,760 B1 | 4/2009 | Daynes et al. |
| 7,613,599 B2 | 11/2009 | Bade et al. |
| 7,694,287 B2 | 4/2010 | Singh et al. |
| 7,711,746 B2 | 5/2010 | Bernal et al. |
| 7,984,429 B2 | 7/2011 | Hunt |
| 8,024,719 B2 | 9/2011 | Gorton, Jr. |
| 8,234,296 B1 | 7/2012 | Black |
| 8,560,726 B2 | 10/2013 | Branson et al. |
| 8,612,950 B2 | 12/2013 | Shpeisman et al. |
| 8,694,682 B2 | 4/2014 | Siegemund et al. |
| 8,990,452 B2 | 3/2015 | Branson et al. |
| 9,405,553 B2 | 8/2016 | Branson |
| 2005/0235285 A1 | 10/2005 | Monasterio |
| 2009/0007116 A1 | 1/2009 | Duffy et al. |
| 2009/0300615 A1 | 12/2009 | Andrade et al. |
| 2010/0292980 A1 | 11/2010 | Andrade et al. |
| 2010/0293534 A1 | 11/2010 | Andrade et al. |
| 2011/0041132 A1 | 2/2011 | Andrade et al. |
| 2012/0159464 A1 | 6/2012 | Demetriou et al. |
| 2012/0179809 A1 | 7/2012 | Barsness et al. |
| 2013/0031282 A1 | 1/2013 | Amini et al. |
| 2013/0166942 A1 | 6/2013 | Branson et al. |
| 2013/0166948 A1 | 6/2013 | Branson et al. |
| 2013/0198489 A1 | 8/2013 | Branson et al. |
| 2013/0239100 A1 | 9/2013 | Andrade et al. |
| 2014/0095503 A1 | 4/2014 | Branson et al. |
| 2014/0122557 A1 | 5/2014 | Branson et al. |
| 2014/0122559 A1 | 5/2014 | Branson et al. |
| 2014/0196017 A1 | 7/2014 | Halim et al. |

OTHER PUBLICATIONS

IBM Appendix P, documents to be treated as related, filed herewith, pp. 1-2.

U.S. Appl. No. 15/042,951, filed Feb. 12, 2016, Application to be Treated as Related, document not enclosed, for Examiner's eyes only.

Sridranop et al., "Adding Polymorphic Tuples and Lists to the Syntax of Java," ACMSE '04, Apr. 2-3, 2004, pp. 255-260.

Stovall et al., "Resource Discovery with Evolving Tuples," ESSPE '07, Sep. 4, 2007, pp. 1-10.

IBM Listing of Patent Applications to be Treated as Related, filed herewith Jan. 4, 2017, pp. 2.

Reeuwijk et al., "Adding Tuples to Java: A Study in Lightweight Data Structures," JGI'02, Nov. 3-5, 2002, pp. 185-191.

Mamei et al., "Self-Maintained Distributed Tuples for Field-Based Coordination in Dynamic Networks," SAC '04, Mar. 14-17, 2004, 2004 ACM Symposium on Applied Computing, pp. 479-486.

Deaker et al., "Dynamic Previews for Building Digital Libraries," OZ CHI '12, Nov. 26-30, 2012, pp. 93-96.

Chiba et al., "A Scheme of Dynamic Attributes Addition for Tuple Datasets," iiWAS'16, Nov. 28-30, 2016, Singapore, pp. 1-5.

Gjondrekaj, et al., "Modeling Adaptation with a Tuple-Based Coordination Language," SAC'12 Mar. 25-29, 2012, Riva del Garda, Italy, pp. 1522-1527.

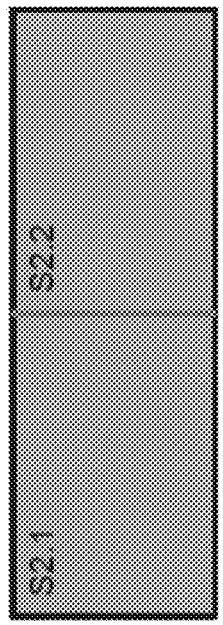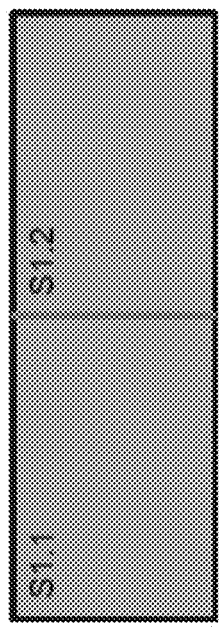
FIG. 5

SYSTEM AND METHOD FOR RUNTIME GROUPING OF PROCESSING ELEMENTS IN STREAMING APPLICATIONS

RELATED APPLICATIONS

The subject application is a continuation application of U.S. patent application with Ser. No. 15/242,703, filed on Aug. 22, 2016, which is a continuation application of U.S. patent application with Ser. No. 14/953,960, filed on Nov. 30, 2015, the entire contents of which are herein incorporated by reference.

BACKGROUND

Many times in solving problems with "large" data sets, there may be issues acquiring enough computing power to address the problem in the desired timeframe. The result may be that often time a distributed processing job overloads a number (or cluster) of the machines that may be dedicated to computing the solution. In example MapReduce style computations (or the like), a resource manager may be used to allocate machines at each of the Map and Reduce steps to attempt to alleviate stresses placed on a subset of the computing cluster. Streaming computing may present additional/alternative issues.

For example, since the computation may be constantly occurring for every processing phase at all times, it may be difficult to use conventional resource managers (e.g., used for non-streaming computing) to allocate resources. For instance, there may never be an ending of a streaming computing process, thus resource managers may see constant usage, and without knowledge of the stream processing topology, the resource managers may not be able to safely remove a machine without potentially introducing a break in the processing graph. Adding additional resources may also present similar complications.

BRIEF SUMMARY OF DISCLOSURE

In one example implementation, a method, performed by one or more computing devices, may include but is not limited to dynamically grouping and un-grouping, by a computing device, processing operators and processing elements used by a streaming application. A distributed processing elements utilization of resources may be monitored to identify candidate operators and candidate processing elements for at least one of parallelization and fusion. At runtime, via at least one of parallelization and fusion, the grouping and un-grouping of the identified candidate operators and candidate processing elements may be dynamically adjusted.

One or more of the following example features may be included. A first processing element of the identified candidate processing elements may be identified with the distributed processing elements resource utilization exceeding an upper threshold, a second processing element of the identified candidate processing elements may be identified with the distributed processing elements resource utilization below a lower threshold, and a fusion of the first and second processing elements may be executed. Responsive to changes in system topology based upon, at least in part, outside use of a resource manager, an upper threshold of a first system by a first processing element of the identified candidate processing elements may be detected and the first processing element may be parallelized to a newly available resource from the resource manager. Responsive to changes in the system topology based upon, at least in part, outside use of the resource manager, the lower threshold of a second system by a second processing element of the identified candidate processing elements may be detected and the second processing element may be fused with a third processing element of the identified candidate processing elements to release the second system to the resource manager. Executing fusion may include splitting a portion of operators grouped in the first processing element and grouping the portion of the operators in the second processing element. Parallelization may include a graph transform. The grouping and un-grouping of the identified candidate operators and candidate processing elements may be dynamically adjusted, at runtime, via at least one of parallelization and fusion, based upon, at least in part, a tuple flow rate of the operators. The dynamic adjusting may be performed without user intervention.

In another example implementation, a computing system includes a processor and a memory configured to perform operations that may include but are not limited to dynamically grouping and un-grouping processing operators and processing elements used by a streaming application. A distributed processing elements utilization of resources may be monitored to identify candidate operators and candidate processing elements for at least one of parallelization and fusion. At runtime, via at least one of parallelization and fusion, the grouping and un-grouping of the identified candidate operators and candidate processing elements may be dynamically adjusted.

One or more of the following example features may be included. A first processing element of the identified candidate processing elements may be identified with the distributed processing elements resource utilization exceeding an upper threshold, a second processing element of the identified candidate processing elements may be identified with the distributed processing elements resource utilization below a lower threshold, and a fusion of the first and second processing elements may be executed. Responsive to changes in system topology based upon, at least in part, outside use of a resource manager, an upper threshold of a first system by a first processing element of the identified candidate processing elements may be detected and the first processing element may be parallelized to a newly available resource from the resource manager. Responsive to changes in the system topology based upon, at least in part, outside use of the resource manager, the lower threshold of a second system by a second processing element of the identified candidate processing elements may be detected and the second processing element may be fused with a third processing element of the identified candidate processing elements to release the second system to the resource manager. Executing fusion may include splitting a portion of operators grouped in the first processing element and grouping the portion of the operators in the second processing element. Parallelization may include a graph transform. The grouping and un-grouping of the identified candidate operators and candidate processing elements may be dynamically adjusted, at runtime, via at least one of parallelization and fusion, based upon, at least in part, a tuple flow rate of the operators. The dynamic adjusting may be performed without user intervention.

In another example implementation, a computer program product resides on a computer readable storage medium that has a plurality of instructions stored on it. When executed by a processor, the instructions cause the processor to perform operations that may include but are not limited to dynamically grouping and un-grouping processing operators and processing elements used by a streaming application. A distributed processing elements utilization of resources may be monitored to identify candidate operators and candidate processing elements for at least one of parallelization and fusion. At runtime, via at least one of parallelization and fusion, the grouping and un-grouping of the identified candidate operators and candidate processing elements may be dynamically adjusted. At runtime, via at least one of parallelization and fusion, the grouping and un-grouping of the identified candidate operators and candidate processing elements may be dynamically adjusted.

One or more of the following example features may be included. A first processing element of the identified candidate processing elements may be identified with the distributed processing elements resource utilization exceeding an upper threshold, a second processing element of the identified candidate processing elements may be identified with the distributed processing elements resource utilization below a lower threshold, and a fusion of the first and second processing elements may be executed. Responsive to changes in system topology based upon, at least in part, outside use of a resource manager, an upper threshold of a first system by a first processing element of the identified candidate processing elements may be detected and the first processing element may be parallelized to a newly available resource from the resource manager. Responsive to changes in the system topology based upon, at least in part, outside use of the resource manager, the lower threshold of a second system by a second processing element of the identified candidate processing elements may be detected and the second processing element may be fused with a third processing element of the identified candidate processing elements to release the second system to the resource manager. Executing fusion may include splitting a portion of operators grouped in the first processing element and grouping the portion of the operators in the second processing element. Parallelization may include a graph transform. The grouping and un-grouping of the identified candidate operators and candidate processing elements may be dynamically adjusted, at runtime, via at least one of parallelization and fusion, based upon, at least in part, a tuple flow rate of the operators. The dynamic adjusting may be performed without user intervention.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 5 is an example two system deployment according to one or more example implementations of the disclosure;

Like reference symbols in the various drawings indicate like elements.

DETAILED DESCRIPTION

Figure 1:
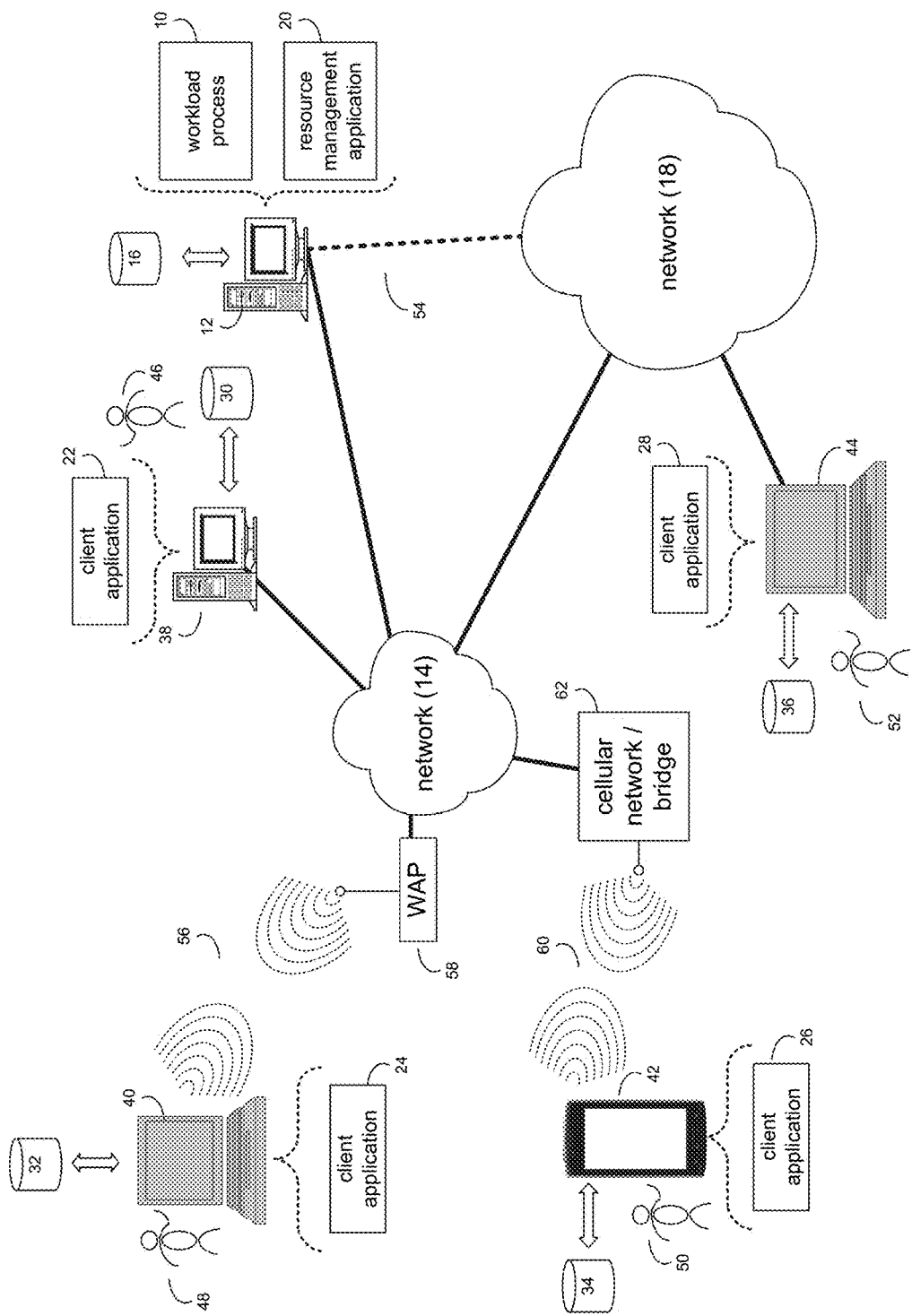
FIG. 1 is an example diagrammatic view of a workload process coupled to a distributed computing network according to one or more example implementations of the disclosure.

System Overview:

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, there is shown workload process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, workload process 10 may dynamically group and un-group, by a computing device, processing operators and processing elements used by a streaming application. A distributed processing elements utilization of resources may be monitored to identify candidate operators and candidate processing elements for at least one of parallelization and fusion. At runtime, via at least one of parallelization and fusion, the grouping and un-grouping of the identified candidate operators and candidate processing elements may be dynamically adjusted.

The instruction sets and subroutines of workload process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. Workload process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a resource manager application (e.g., resource manager application 20), examples of which may include, but are not limited to, e.g., any application that allows for allocation (and/or temporary allocation loaning) and/or requesting back of machines (and their resources, such as, e.g., primary memory and secondary memory, processor(s), bandwidth, graphics and sound, networks, cache, etc.) at each of the Map and Reduce steps (or otherwise) to attempt to alleviate stresses placed on a subset of the computing cluster. Workload process 10 and/or resource manager application 20 may be accessed via client applications 22, 24, 26, 28. Workload process 10 may be a standalone application, or may be an applet/application/script/extension that may interact with and/or be executed within resource manager application 20, a component of resource manager application 20, and/or one or more of client applications 22, 24, 26, 28. Resource manager application 20 may be a standalone application, or may be an applet/application/script/extension that may interact with and/or be executed within workload process 10, a component of workload process 10, and/or one or more of client applications 22, 24, 26, 28. One or more of client applications 22, 24, 26, 28 may be a standalone application, or may be an applet/application/script/extension that may interact with and/or be executed within and/or be a component of workload process 10 and/or resource manager application 20. Examples of client applications 22, 24, 26, 28 may include, but are not limited to, e.g., any application that allows for allocation (and/or temporary allocation loaning) and/or requesting back of machines (and their resources, such as, e.g., primary memory and secondary memory, processor(s), bandwidth, graphics and sound, networks, cache, etc.) at each of the Map and Reduce steps (or otherwise) to attempt to alleviate stresses placed on a subset of the computing cluster, a standard and/or mobile web browser, an email application (e.g., an email client application), a textual and/or a graphical user interface, a customized web browser, a plugin, an Application Programming Interface (API), a streaming application platform, or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of workload process 10 (and vice versa). Accordingly, workload process 10 may be a purely server-side application, a purely client-side application, or a hybrid server-side/client-side application that is cooperatively executed by one or more of client applications 22, 24, 26, 28 and/or workload process 10.

One or more of client applications 22, 24, 26, 28 may be configured to effectuate some or all of the functionality of resource manager application 20 (and vice versa). Accordingly, resource manager application 20 may be a purely server-side application, a purely client-side application, or a hybrid server-side/client-side application that is cooperatively executed by one or more of client applications 22, 24, 26, 28 and/or resource manager application 20. As one or more of client applications 22, 24, 26, 28, workload process 10, and resource manager application 20, taken singly or in any combination, may effectuate some or all of the same functionality, any description of effectuating such functionality via one or more of client applications 22, 24, 26, 28, workload process 10, resource manager application 20, or combination thereof, and any described interaction(s) between one or more of client applications 22, 24, 26, 28, workload process 10, resource manager application 20, or combination thereof to effectuate such functionality, should be taken as an example only and not to limit the scope of the disclosure.

Users 46, 48, 50, 52 may access computer 12 and workload process 10 (e.g., using one or more of client electronic devices 38, 40, 42, 44) directly through network 14 or through secondary network 18. Further, computer 12 may be connected to network 14 through secondary network 18, as illustrated with phantom link line 54. Workload process 10 may include one or more user interfaces, such as browsers and textual or graphical user interfaces, through which users 46, 48, 50, 52 may access workload process 10.

The various client electronic devices may be directly or indirectly coupled to network 14 (or network 18). For example, client electronic device 38 is shown directly coupled to network 14 via a hardwired network connection.

Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
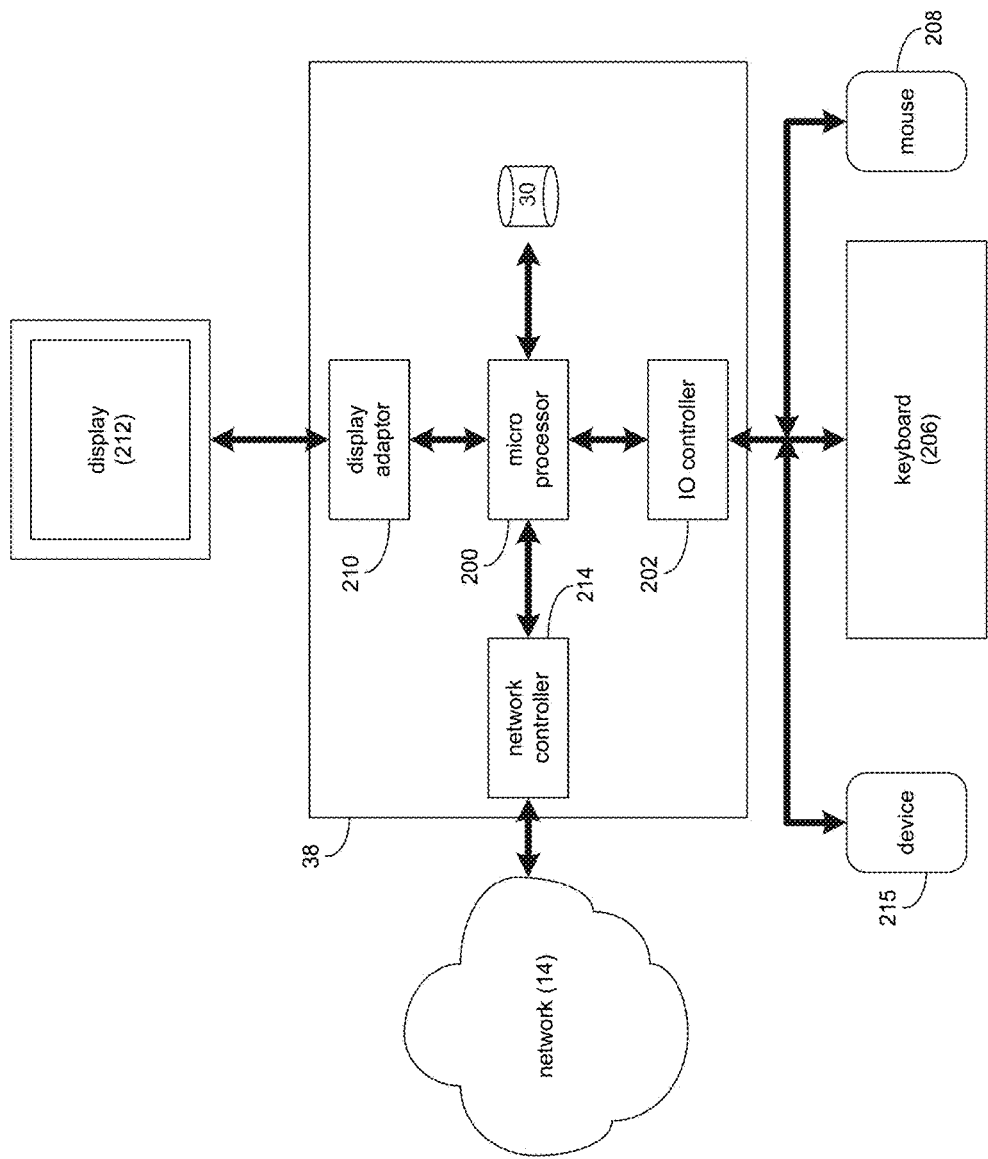
FIG. 2 is an example diagrammatic view of a client electronic device of FIG. 1 according to one or more example implementations of the disclosure.
Figure 3:
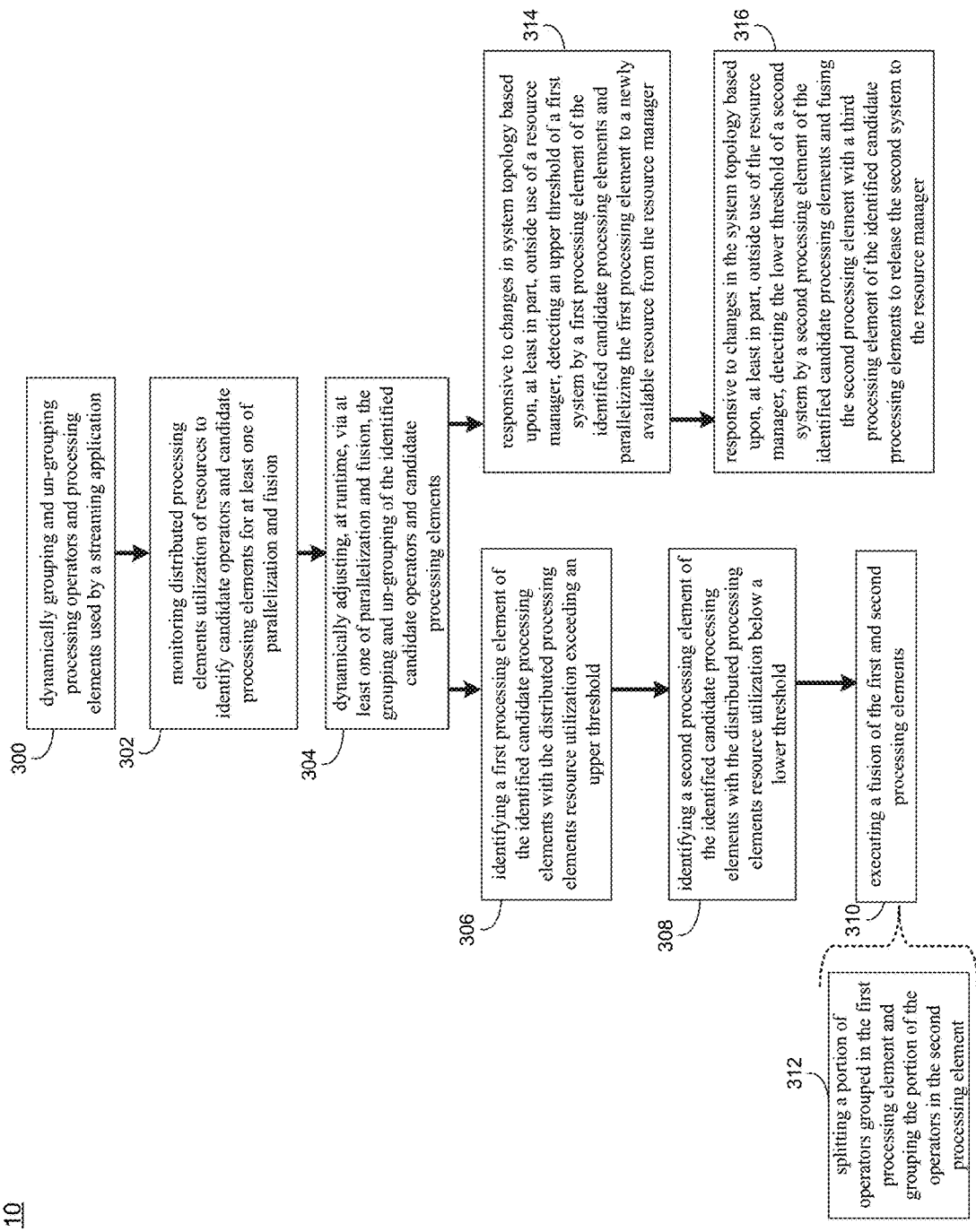
FIG. 3 is an example flowchart of the workload process of FIG. 1 according to one or more example implementations of the disclosure.
Figure 4:
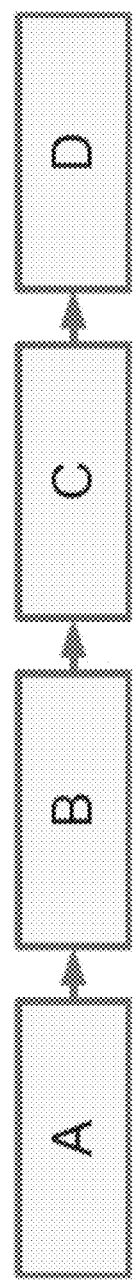
FIG. 4 is an example user application operator graph according to one or more example implementations of the disclosure.

Referring also to FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, workload process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, a constantly running real-time system may need a constant assessment of its resource consumption, as data flow may be less predictable. Adding and removing capacity from a system may have an inherent latency to it, since, e.g., real time systems may not be able to afford to constantly shuffle resources in and out, as it may impact the real-time nature of their processing. In some implementations, workload process 10 may run as part of a streaming application platform, such as the IBM InfoSphere Streams platform, and may constantly assess the capacity of the system, and may, in some implementations, only surrender capacity when resource usage has fallen below a threshold, such that two processing elements within the system topology may be fused together. The fusion and replication processes of workload process 10 may be unique to streaming applications, and thus not something that may be "easily" externalized to a third party resource manager, such as resource manager application 20.

The Workload Process:

As discussed above and referring also at least to FIGS. 3-7, workload process 10 may dynamically group/un-group 300, by a computing device, processing operators and processing elements used by a streaming application. A distributed processing elements utilization of resources may be monitored 302 by workload process 10 to identify candidate operators and candidate processing elements for at least one of parallelization and fusion. At runtime, via at least one of parallelization and fusion, the grouping/un-grouping of the identified candidate operators and candidate processing elements may be dynamically adjusted 304 by workload process 10.

As noted above, many times in solving problems with "large" data sets, there may be issues acquiring enough computing power to address the problem in the desired timeframe. The result may be that often time a distributed processing job overloads a number (or cluster) of the computer machines that may be dedicated to computing the solution. In example MapReduce style computations (or the like), a resource manager may be used to allocate entire machines at each of the Map and Reduce steps to attempt to alleviate stresses placed on a subset of the computing cluster. Streaming computing may present additional/alternative issues. For example, since the computation may be constantly occurring for every processing phase at all times, it may be difficult to use conventional resource managers (e.g., for use with non-streaming computing) to allocate resources. For instance, there may never be an ending of a streaming computing process, thus resource managers may see constant usage, and without knowledge of the stream processing topology, the resource managers may not be able to safely remove a machine without potentially introducing a break in the processing graph.

As will be described in greater detail, workload process 10 may manage workloads within the stream processing graph (e.g., for streaming applications) and may enable the offering and requesting of machines from a conventional resource manager (e.g., resource manager application 20), without introducing data processing latency to the streaming application. Workload process 10 may enable the manipulation of the stream processing topology during runtime, while being cognizant of any congestion or backpressure created. In some implementations, this may enable workload process 10 to build a streaming data resource manager that may then interact with a conventional resource manager. In some implementations, workload process 10 (e.g., with the streaming data resource manager) may interact with a resource manager at application submission time and/or runtime. It will be appreciated that workload process 10 may be used with variable rate data flows (which may encompasses smaller data sets). As such, the description of using "large" data sets should be taken as example only.

Figure 6:
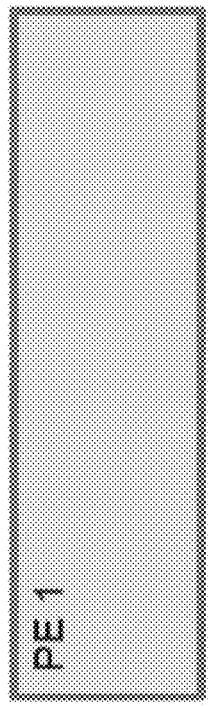
FIG. 6 is an example two system deployment of fusion according to one or more example implementations of the disclosure.
Figure 7:
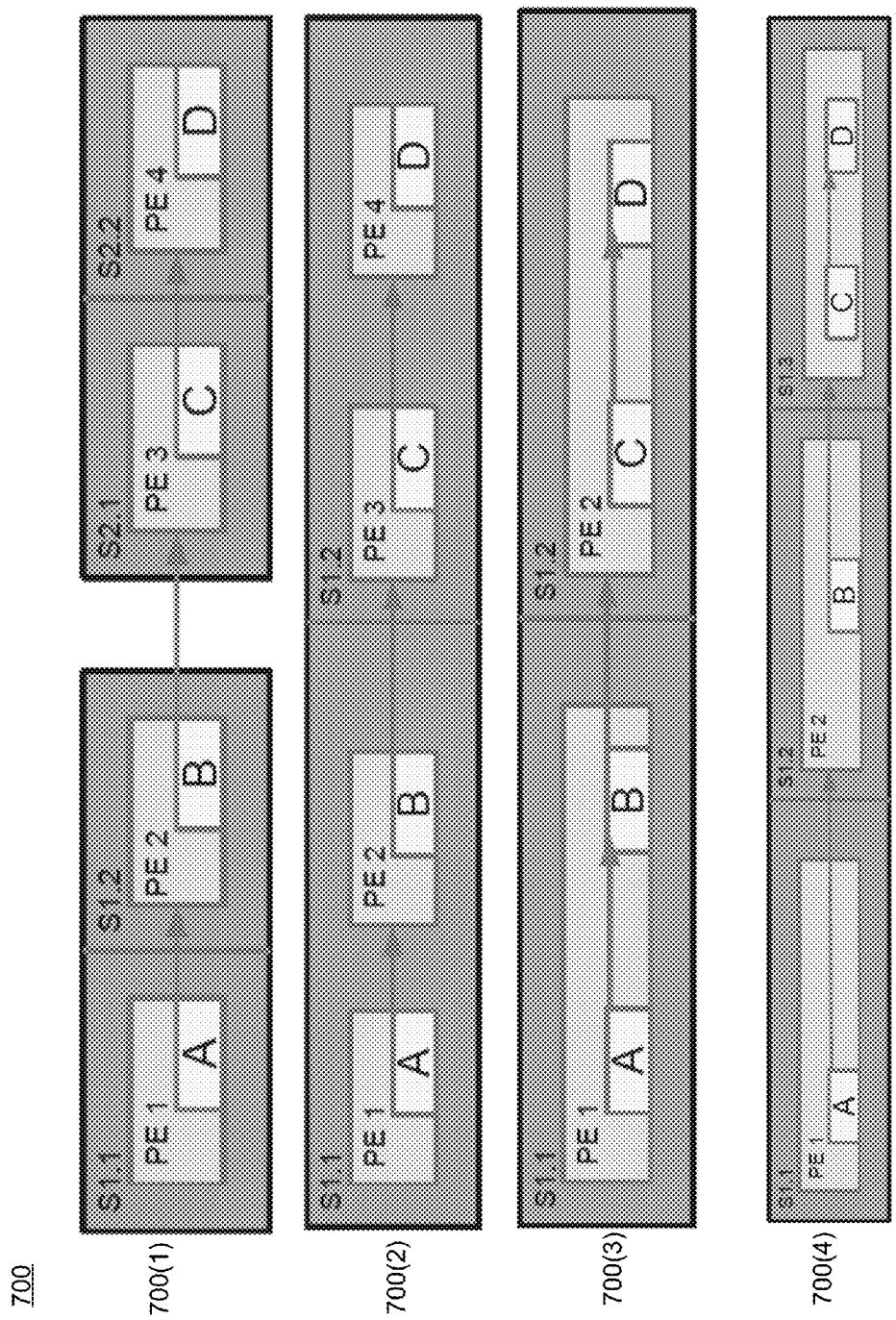
FIG. 7 is an example deployment of parallelization according to one or more example implementations of the disclosure.

Assume for example purposes only that a user, e.g., user 46, writes via a user interface of workload process 10, an application as a series of steps, or "operators". In the example, the operators may be submitted to the above-noted streaming application platform portion of workload process 10, which may be turned into "processing elements" when they are deployed to a system. In some implementations, processing elements may be generally described as a container that includes one or more operators. For example, and referring at least to FIG. 4, an example user application (operator graph) 400 is shown. In the example, four operators are shown (e.g., operator A, operator B, operator C, and operator D). Each of the boxes may represent an individual step that the user has coded. In the example, if the user viewed their code as a series of linked steps, this is how it may appear. This may be commonly referred to as a "logical" view as it may be each of the "logical steps" of the application. In some implementations, such as the above-noted streaming application platform portion of workload process 10, workload process 10 may form each of these operators into their own processing element at compilation time, which may mean that the operators may run as their own execution processing, which may require their own network handlers, heap, etc. In some implementations, and referring at least to FIG. 5, and example implementation deployment 500 to two systems is shown. For the example, FIG. 5 shows the systems. The black perimeter outline represents a physical system, with the vertical grey line in the middle segmenting the cores. Ex: This is 2 systems, each has 2 processor cores. The systems are marked as System#.Core# for the examples. Referring at least to FIG. 6, an example processing element (PE) 600 is shown. The user operators (A, B, C, D from FIG. 4) may not go to a system without being wrapped in a processing element. A processing element may contain 1 or more user operators.

However, in some implementations, the deployment 500 of FIG. 5 may have more than 4 operators. For example, imagine instead of 4 operators, there are, e.g., 400. In the example, operator A may no longer require an output network handler, and operator B may no longer require an input network handler. A and B may be formerly both separate processes on the same machine. They may communicate through a socket (e.g., network handler). When they are fused, they may become 1 process. Within a process, they may simply access each other's memory making the data transfer instant and eliminating the need for the communication code that may have been previously required. In the example, the operating system (e.g., via workload process 10) may not have to "context switch" between operator A and operator B. For example, in an effort to be fair to all programs running, Operating Systems may do a round robin and give CPU time to all running processes. If a machine has 2 cores and only 2 processes, it may never need to do this round robin, which means workload process 10 may not have to save process state and load in the new one. In the example, case A and B fuse because there is one process and they may rather pool their time slots than exist separately and be forced to load/unload every time it may be their turn to run. In some implementations, workload process 10 may perform the reverse process. As will be discussed in greater detail below, these processes may be called fusion. It will be appreciated that any number of operators and/or processing elements may be used without departing from the scope of the disclosure.

In some implementations, as will be discussed in greater detail, parallelization may include a graph transform by workload process 10. For instance, and referring at least to FIG. 7, an example deployment 700 in example stages (e.g., 700(1), 700(2), 700(3), 700(4) of parallelization is shown. In the example, workload process 10 may perform parallelization, which via workload process 10 may perform a graph transform (e.g., from the original operator A→D graph in FIG. 4), where operator B may be congested because it may be a very slow process compared to operators A, C, and D. In the example 700(1), 2 system, 2 core, 4 user operator, FIG. 7 may be the default and ideal deployment. This may be the placement output, at least initially. In some implementations, it may follow that guideline of workload process 10 creating 1 processing elements per processing core. That gives 4 processing elements, which matches nicely with 4 user operators. Referring to 700(2), with previous implementations, it may be noticed that there are 2 processing elements on each processor core. That may not be idea ideal because they may now have to take turns for who is actively running. This may become more of a problem when workload process 10 scales up the number of things that take turns, but for example purposes only two are described. Referring to 700(3), it is shown that there are only 2 processors, where workload process 10 may decide to execute fusion. In some implementations, fusion may prefer grabbing the nearest neighbor. As such, workload process 10 may look at source (A), and sink (D) and pull in their neighbors, thus creating AB and CD. Workload process 10 successfully has made it down to the desired processing element count, and may be finished for now. Referring now to 700(4), it will be appreciated that there may be less clean scenarios, ones where the division is more difficult. For example, assume the same 4 operators and 3 processors. When deciding who gets fused, workload process 10 may use historical metrics (if available) to decide. If historical metrics are not available, workload process 10 may fuse the last two together. Once it is running, workload process 10 may change it if metrics indicate it isn't optimal. In some implementations, it tends to be that users filter data out, so as workload process 10 goes along the graph, less is being processed. If the ingest rate is X, workload process 10 may be processing X or less by the end, rarely ever more. Hence, the default setting may be to fuse from the end if workload process 10 does not have metric information to tell which ones should fuse.

As discussed throughout, in some implementations, workload process 10 may dynamically group/un-group 300, by a computing device, processing operators and processing elements used by a streaming application. For example, workload process 10 may group/ungroup, e.g., 300 operators A, B, C, D (and/or portions of operators A, B, C, D) into any processing element/container. In some implementations, this may be accomplished by not compiling the operator(s) to an executable format itself, but instead compiling the operator to a library and then implementing a loading mechanism of workload process 10 to be able to move the operator into/out of any process. In some implementations, when compiling a language like C++, the entire application may be built, where workload process 10 may know where everything is and has optimized for that. Workload process 10 may also build code into libraries, where workload process 10 may have each operator built as a library. Workload process 10 may then load the library at runtime as needed. The loading mechanism in Java may be the Java Classloader. It will be appreciated that other languages (such as those noted above) may be used without departing from the scope of the disclosure.

It will be appreciated that operators may have placement constraints on them. For instance, workload process 10 may not only determine which processing elements (e.g., containers) each operator may enter, but may also take into consideration metrics to decide if, e.g., operator A, should merge with, e.g., operator B, or if, e.g., operator B should merge with, e.g., operator C, etc. The threshold constraints at which fusion (and/or parallelization) of operators may occur may be a configurable option via a user interface associated with workload process 10, such that a user (e.g., system administrator) may make resource allocation more or less strict, e.g., if they believe their data flows are burst like in nature and that the time to rebalance load may cause undue latency within their system. Other examples of constraints may include, e.g., collocation, exlocation, partition, processor architecture, OS, required software, etc. Other examples of metrics may include, e.g., tuples/sec, backpressure queue size, CPU processing time, memory consumption, network utilization, etc.

In some implementations, the grouping/un-grouping 300 of the identified candidate operators and candidate processing elements may be dynamically adjusted 304 by workload process 10, at runtime, via at least one of parallelization and fusion, based upon, at least in part, a tuple flow rate of the operators. Since Streams may be used for real time data processing, it may be important how long it takes to process a piece of data from start to finish. Therefore, if workload process 10 sees somewhere being exceptionally slow, workload process 10 may want to get more machines doing that operation so that workload process 10 does not hold up all the data flows. Workload process 10 may want to facilitate the flow of data so additional processing avenues may open up for it. Workload process 10 may detect the tuple flow rate issues via that metric and the backpressure metric which may tell workload process 10 how many tuples are waiting to be processed at each operator (large number may indicate this step is slower than its predecessor).

In some implementations, a distributed processing elements utilization of resources may be monitored 302 by workload process 10 to identify candidate operators and candidate processing elements for at least one of parallelization and fusion. For example, workload process 10 may monitor 302 per operator statistics regardless of the number of operators in a processing element (e.g., container). Workload process 10 may monitor processing element statistics. Monitoring 302 may enable workload process 10 to see inside the processing element and make an informed decision as to which processing elements may benefit from fusion/parallelization/movement. In some implementations, the statistics may be transient or temporary. For instance, one or more of the above-noted metrics and constraints may be transient or temporary. Notably, this is something a conventional resource manager is not understood to be able to do. For example, it will be appreciated that applications are seen as "black-boxes" to resource managers, so they may only move processes. By contrast, workload process 10 may allow movement (e.g., via fusion/parallelization) of processes and/or parts of processes. In some implementations, a processing element may be an operating system process, and an operator may be a portion of a processing element. As noted above, workload process 10 may execute dynamic loading/unloading. Workload process 10 may use this to do the add/remove of the operator from the processing element In some implementations, at runtime, via at least one of parallelization and fusion, the grouping/un-grouping 300 of the identified candidate operators and candidate processing elements may be dynamically adjusted 304 by workload process 10. Runtime may be generally described as the period during which an application is executing. Thus, in the example implementations, runtime may be described as a period during which an the identified candidate operators and candidate processing elements of a streaming application are being executed. In some implementations, runtime fusion may enable (via workload process 10) an application to continuously be optimized in an environment that may not be stable (e.g., five hosts one day, six hosts the next, back to five hosts the next day, etc.) In some implementations, while system resource utilization may be monitored 302 at runtime, other resources may be monitored 302 at runtime as well. For example, workload process 10 may flow data, or tuples, one at a time across the network. In some cases, e.g., due to the network topology, workload process 10 may detect sub-optimal throughput. In the example, workload process 10 may group/un-group 300 operators and/or processing elements identified as candidates responsive to the monitoring by changing (during runtime) placement of operators or fusion based on statistics about network performance. For instance, if a specific operator also has network issues, workload process 10 may implement parallelization to allow the operator more access to throughput than any one system may provide.

In some implementations, the dynamic adjusting 304 may be performed by workload process 10 without user intervention. For example, how does workload process 10 know when to change the workload? Workload process 10 may trigger on events, be it resource manager, metrics, system crash, etc. How does workload process 10 know the new optimal workload? Workload process 10 may score each possible graph transform, doing its best to estimate resource utilization and tuple flow rates and trying to maximize both based on historical data.

In some implementations, a first processing element of the identified candidate processing elements may be identified 306 by workload process 10 with the distributed processing elements resource utilization exceeding an upper threshold, a second processing element of the identified candidate processing elements may be identified 308 by workload process 10 with the distributed processing elements resource utilization below a lower threshold, and a fusion of the first and second processing elements may be executed 310 by workload process 10. Executing 310 fusion may include workload process 10 splitting 312 a portion of operators grouped in the first processing element and grouping 300/312 the portion of the operators in the second processing element. For example, assume for example purposes only that user 46 writes a "large" number of operators (e.g., 200), and submits them via workload process 10 to ten hosts. It will be appreciated that any number of operators may be used without departing from the scope of the disclosure. As an initial pass, workload process 10 may try to place one processing element/container per processor and 2 GB of RAM. In the example, assume ten hosts with four cores per host, the system may not have enough core to go around. For example, assume for example purposes only that there are 200 operators, where it is desired to have 1 processing element per CPU core. In the example, there are 10 systems with 4 cores per system. 10*4=40 processing element slots. 200 Operators/40 Slots=5 Operators per processing element. Workload process 10 may walk the graph and attempt to put 5 neighboring Operators together until there are 40 blocks. Thus, in the example, workload process 10 may execute 310 fusion of operators together. In some implementations, this execution 310 of fusion may occur blindly, as workload process 10 has not yet executed the application to obtain the proper analysis/statistics during runtime, and without the analysis, workload process 10 may not have sufficient knowledge of how the user's code may perform. Continuing with the example, during runtime, workload process 10 may split 312 the application into, e.g., forty blocks of five operators (to the best extent possible). Again, this, when deployed during runtime, still may not be the optimal configuration. For example, ingest operators (like operator A) may tend to deal with higher traffic volumes because there is no filter, so workload process 10 may determine that it may be better to run operator A in its own processing element and the following seven operators together in the same processing element. Thus, in some implementations, the above-noted monitoring 302 and dynamic grouping/ungrouping 304 may occur constantly or at predetermined intervals during runtime to obtain the optimal configuration.

In some implementations, workload process 10 may obtain this information by looking at the per operator statistics, and if monitoring 302 identifies 306 a processing element exceeding its upper predetermined profile box threshold (e.g., 1 core, 2 GB memory), workload process 10 may iteratively determine whether the processing element may be split 312 and fused to other parts of the system (e.g., other operators and/or processing elements) to make more sense by grouping 300 parts of the processing element (e.g., the operators contained within the processing element) to another processing element(s) that may be identified 308 as using less than a lower predetermined profile box threshold of a core (e.g., 50% of one core). Conversely, in some implementations, workload process 10 may analyze and identify 308 two or more processing elements with low load, and decide to fuse them, which may open up a system for a higher load processing to split 312, or to return a resource to a resource manager, etc. It will be appreciated that other examples of upper and lower thresholds may be used without departing from the scope of the disclosure. For example, the above-noted metrics and constraints may be used with upper and lower thresholds.

Figure 8:
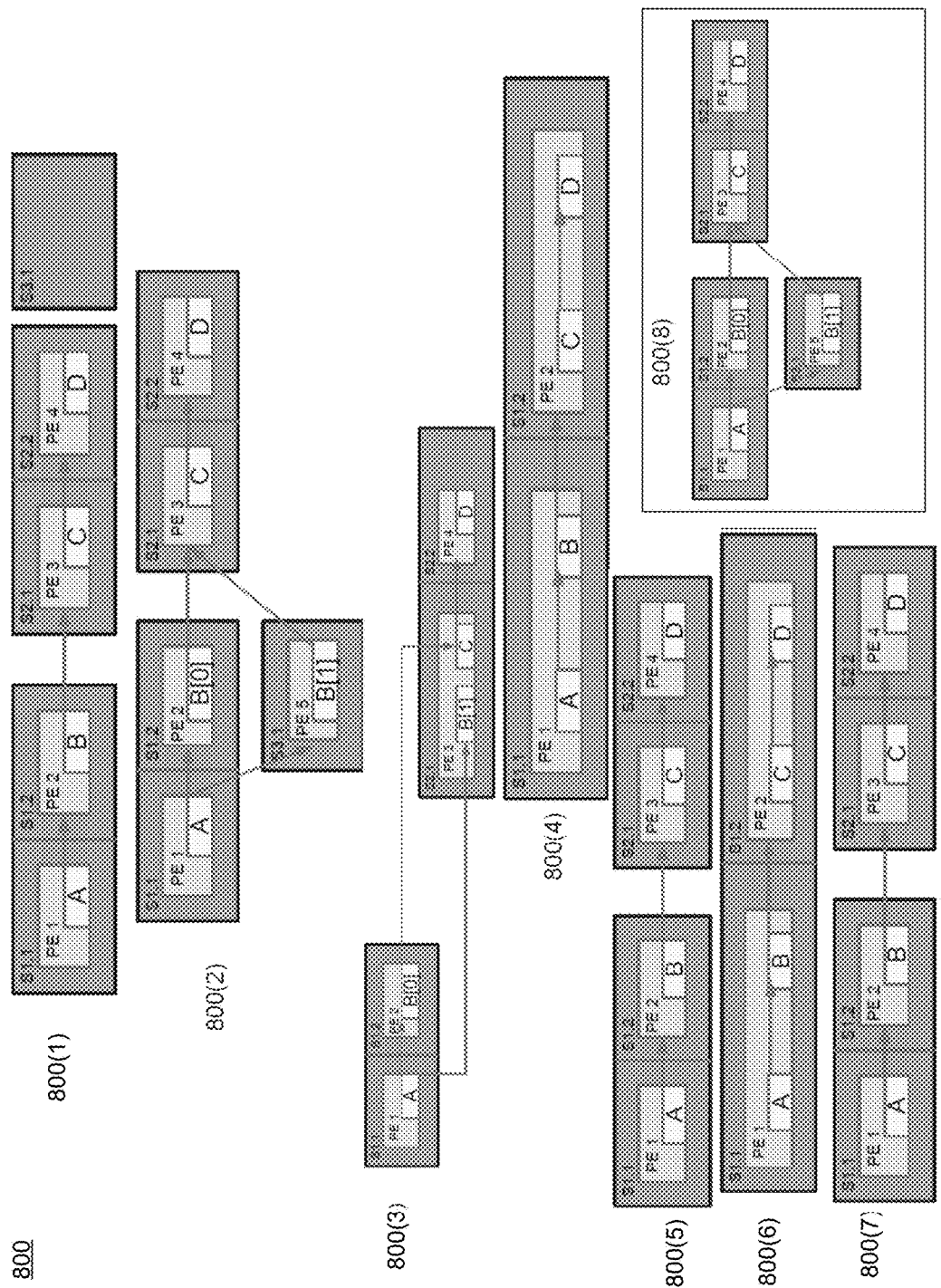
FIG. 8 is an example deployment according to one or more example implementations of the disclosure.

In some implementations, responsive to changes in system topology based upon, at least in part, outside use of a resource manager, the upper threshold of a first system by a first processing element of the identified candidate processing elements may be detected 314 by workload process 10 and the first processing element may be parallelized by workload process 10 to a newly available resource from the resource manager. Responsive to changes in the system topology based upon, at least in part, outside use of the resource manager, the lower threshold of a second system by a second processing element of the identified candidate processing elements may be detected 316 by workload process 10 and the second processing element may be fused by workload process 10 with a third processing element of the identified candidate processing elements to release the second system to the resource manager. For example, and referring at least to FIG. 8, an example deployment 800 is shown with six stages (e.g., 800(1), 800(2), 800(3), 800(4), 800(5), 800(6), 800(7), and 800(8). In some implementations, by default, workload process 10 may not perform parallelization unless the user directs it. The optimal deployment, in some implementations, may be 1 user operator per processing element and 1 processing element per system. However, as congestion/metrics/etc. demands, workload process 10 may parallelize operations. Referring to 800(1) it is shown beginning with an example ideal deployment, but with a 3rd system added. As mentioned above, the third system may be unused initially since there is 1 operator per processing element per host. Referring at least to 800(2), assume that B is suffering from congestion. It has more traffic than it can process. If B could go faster the whole system may process more data per second. This is an example of tuple flow rate metric driven change. Workload process 10 may now decide to fuse or parallelize. Since workload process 10 has a spare system, workload process 10 may decide the first solution is to expand. Thus, workload process 10 may replicate B so there will be two copies of it going and split the traffic evenly between the two of them. They may both still send their results to C. The bracket notation is for referencing multiple copies of the same operator. Referring at least to 800(3), assume there is a need to do this with just the original two systems. Workload process 10 may take the lowest load system (use metrics), and assume for example purposes only that it is C. Workload process 10 may then duplicate B and fuse B[1] with C. Referring at least to 800(4), resource manager operations may include, e.g., request new host, request host return, new host available, etc. In a non-ideal deployment, there was only 1 system available. In the example cluster, there may be this 2nd system that does Map-Reduce jobs overnight (e.g., via workload process 10). So, when it is not in use, workload process 10 may borrow it. Referring at least to 800(5), an example resource manager event of map-reduce job ended—new host available is shown. In the example, workload process 10 may grab the host and move to the above-noted example ideal deployment. Referring at least to 800(6), an example resource manager event of map-reduce job starting—request host return is shown. In the example, workload process 10 may return the host and go back to the next best ideal example deployment. For example, referring at least to 800(7), assume that B starts to become congested, but there is only the 2 systems available. In the example, workload process 10 may ask the resource manager for another system to alleviate the congestion. Referring at least to 800(8), an example resource manager event of request new host is shown. In the example, the problem is solved. If denied, workload process 10 may consider performing fusion with itself.

In some implementations, the present disclosure may enable the sharing of as many resources as possible with the cluster, while still maintaining processing capacity. The thresholds at which fusion (and/or parallelization) of operators may occur may be a configurable option, such that a user (e.g., system administrator) may make resource allocation more or less strict, e.g., if they believe their data flows are burst like in nature and that the time to rebalance load may cause undue latency within their system. However, it will be appreciated that workload process 10 may work wells with many streaming applications (and/or non-streaming applications) that may be constantly receiving data from users during business hours, but may then surrender much of their respective computing capacity in off hours, which may also be the time larger batch jobs tend to run, and may take advantage of the extra capacity.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
dynamically grouping and un-grouping, by a computing device, processing operators and processing elements used by a streaming application;
monitoring distributed processing elements utilization of resources to identify candidate operators and candidate processing elements for at least one of parallelization and fusion; and
dynamically adjusting, at runtime, via at least one of parallelization and fusion, the grouping and un-grouping of the identified candidate operators and candidate processing elements, wherein dynamically adjusting grouping and un-grouping of the identified candidate operators and candidate processing elements includes:
identifying a first processing element of the identified candidate processing elements with the distributed processing elements resource utilization exceeding an upper threshold;
identifying a second processing element of the identified candidate processing elements with the distributed processing elements resource utilization below a lower threshold; and
executing a fusion of the first and second processing elements.

2. The computer-implemented method of claim 1 further comprising:
responsive to changes in system topology based upon, at least in part, outside use of a resource manager, detecting an upper threshold of a first system by a first processing element of the identified candidate processing elements and parallelizing the first processing element to a newly available resource from the resource manager; and
responsive to changes in the system topology based upon, at least in part, outside use of the resource manager, detecting the lower threshold of a second system by a second processing element of the identified candidate processing elements and fusing the second processing element with a third processing element of the identified candidate processing elements to release the second system to the resource manager.

3. The computer-implemented method of claim 1 wherein executing fusion includes splitting a portion of operators grouped in the first processing element and grouping the portion of the operators in the second processing element.

4. The computer-implemented method of claim 1 wherein parallelization includes a graph transform.

5. The computer-implemented method of claim 1 wherein the grouping and un-grouping of the identified candidate operators and candidate processing elements is dynamically adjusted, at runtime, via at least one of parallelization and fusion, based upon, at least in part, a tuple flow rate of the operators.

6. The computer-implemented method of claim 1 wherein the dynamic adjusting is performed without user intervention.

7. A computer program product residing on a computer readable storage medium having a plurality of instructions stored thereon which, when executed by a processor, cause the processor to perform operations comprising:
dynamically grouping and un-grouping processing operators and processing elements used by a streaming application;
monitoring distributed processing elements utilization of resources to identify candidate operators and candidate processing elements for at least one of parallelization and fusion; and
dynamically adjusting, at runtime, via at least one of parallelization and fusion, the grouping and un-grouping of the identified candidate operators and candidate processing elements, wherein dynamically adjusting grouping and un-grouping of the identified candidate operators and candidate processing elements includes:
identifying a first processing element of the identified candidate processing elements with the distributed processing elements resource utilization exceeding an upper threshold;
identifying a second processing element of the identified candidate processing elements with the distributed processing elements resource utilization below a lower threshold; and
executing a fusion of the first and second processing elements.

8. The computer program product of claim 7 further comprising:
responsive to changes in system topology based upon, at least in part, outside use of a resource manager, detecting an upper threshold of a first system by a first processing element of the identified candidate processing elements and parallelizing the first processing element to a newly available resource from the resource manager; and
responsive to changes in the system topology based upon, at least in part, outside use of the resource manager, detecting a lower threshold of a second system by a second processing element of the identified candidate processing elements and fusing the second processing element with a third processing element of the identified candidate processing elements to release the second system to the resource manager.

9. The computer program product of claim 7 wherein executing fusion includes splitting a portion of operators grouped in the first processing element and grouping the portion of the operators in the second processing element.

10. The computer program product of claim 7 wherein parallelization includes a graph transform.

11. The computer program product of claim 7 wherein the grouping and un-grouping of the identified candidate operators and candidate processing elements is dynamically adjusted, at runtime, via at least one of parallelization and fusion, based upon, at least in part, a tuple flow rate of the operators.

12. The computer program product of claim 7 wherein the dynamic adjusting is performed without user intervention.

13. A computing system including a processor and a memory configured to perform operations comprising:

dynamically grouping and un-grouping processing operators and processing elements used by a streaming application;
monitoring distributed processing elements utilization of resources to identify candidate operators and candidate processing elements for at least one of parallelization and fusion; and
dynamically adjusting, at runtime, via at least one of parallelization and fusion, the grouping and un-grouping of the identified candidate operators and candidate processing elements, wherein dynamically adjusting grouping and un-grouping of the identified candidate operators and candidate processing elements includes:
identifying a first processing element of the identified candidate processing elements with the distributed processing elements resource utilization exceeding an upper threshold;
identifying a second processing element of the identified candidate processing elements with the distributed processing elements resource utilization below a lower threshold; and
executing a fusion of the first and second processing elements.

14. The computing system of claim 13 further comprising:
responsive to changes in system topology based upon, at least in part, outside use of a resource manager, detecting an upper threshold of a first system by a first processing element of the identified candidate processing elements and parallelizing the first processing element to a newly available resource from the resource manager; and
responsive to changes in the system topology based upon, at least in part, outside use of the resource manager, detecting a lower threshold of a second system by a second processing element of the identified candidate processing elements and fusing the second processing element with a third processing element of the identified candidate processing elements to release the second system to the resource manager.

15. The computing system of claim 13 wherein executing fusion includes splitting a portion of operators grouped in the first processing element and grouping the portion of the operators in the second processing element.

16. The computing system of claim 13 wherein parallelization includes a graph transform.

17. The computing system of claim 13 wherein the grouping and un-grouping of the identified candidate operators and candidate processing elements is dynamically adjusted, at runtime, via at least one of parallelization and fusion, based upon, at least in part, a tuple flow rate of the operators.

* * * * *